United States Patent

[11] 3,627,764

[72] Inventors Stephen Slomo Szinai
Wokingham;
Jiban Kumar Chakrabarti, Frimley, both of
England
[21] Appl. No. 821,078
[22] Filed May 1, 1969
[45] Patented Dec. 14, 1971
[73] Assignee Eli Lilly and Company
Indianapolis, Ind.
[32] Priority May 21, 1968
[33] Great Britain
[31] 24,165/68

[54] ADAMANTANOPYRIDAZINE COMPOUNDS
12 Claims, No Drawings
[52] U.S. Cl. .................................................. 260/250,
424/250, 260/468 B
[51] Int. Cl. ...................................................... C07d 51/04
[50] Field of Search........................................... 260/250

[56] References Cited
UNITED STATES PATENTS
3,483,204 12/1969 Marayanan et al. ............ 260/250
OTHER REFERENCES
Chem. Abstract 55, pp. 13,435–13,436 (1961)

Primary Examiner—Nicholas S. Rizzo
Attorneys—Everet F. Smith and Kathleen R. Schmoyer ABSTRACT: Adamantanopyridazine compounds of the formula

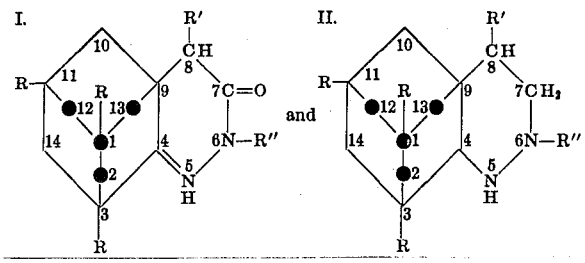

and intermediates useful in the synthesis of these compounds, the intermediates being of the formula:

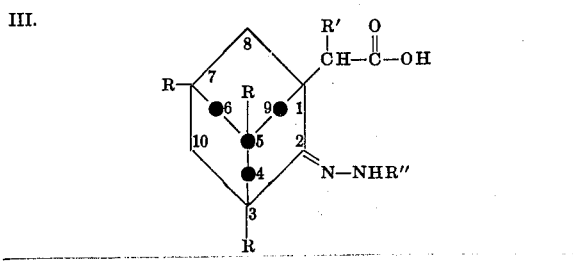

The adamantanopyridazine compounds (formulas I and II) are useful as anti-inflammatory agents and as CNS depressants.

ADAMANTANOPYRIDAZINE COMPOUNDS

SUMMARY OF THE INVENTION

The present invention is concerned with certain adamantanopyridazine compounds and with intermediates useful in their synthesis. The subject matter can more readily be understood by reference to the following summary reaction scheme and definitions:

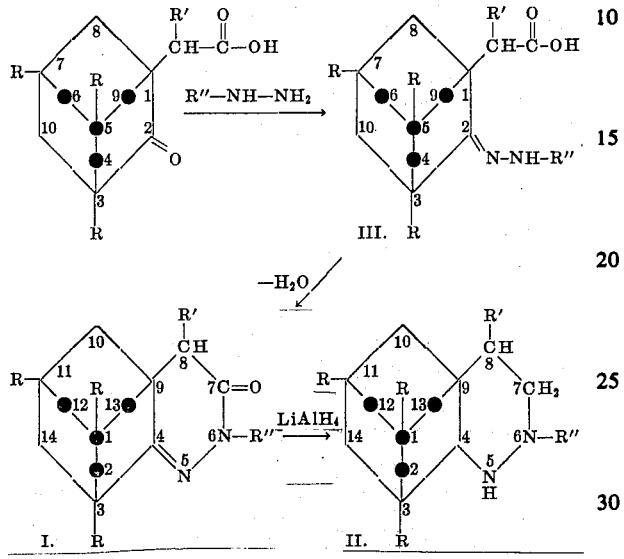

In the formulas above, as well as throughout the present specification and claims, the symbol R represents hydrogen or loweralkyl of $C_1$—$C_3$, both inclusive, the sum of the number of carbon atoms in all three R groups being not greater than 6; R' represents hydrogen or straight-chain loweralkyl of $C_1$—$C_3$; and R'' represents hydrogen, loweralkyl of $C_1$—$C_4$, hydroxyloweralkyl of $C_1$—$C_4$, phenyl, or substituted phenyl of the formula

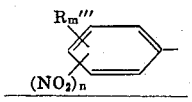

wherein R''' represents bromo, chloro, or methyl; m represents 0–3; and n represents 0–2, the sum of m and n being an integer of from 1 to 3, both inclusive.

DETAILED DESCRIPTION OF THE INVENTION

Standard chemical nomenclature is employed herein. Thus, the starting materials and intermediates are named as derivatives of 1-adamantaneacetic acids; and the ultimate products of the present invention, while generically referred to herein, for the sake of convenience, as adamantanopyridazine compounds, are individually named as derivatives of a tetracyclic structure

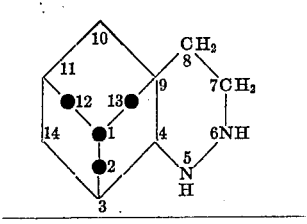

identified as 5,6-diazatetracyclo(7.3.1.1$^{9,11}$.0$^{4,9}$)

As set forth above, the ultimate products of the present invention are prepared by a series of reactions.

The initial reaction is the reaction of a 2-keto-1-adamantaneacetic acid:

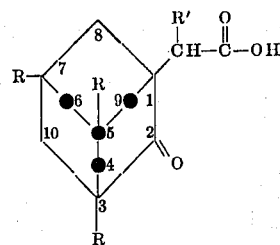

with a substituted hydrazine of the formula:
NH$_2$—NH—R''
to yield the corresponding hydrazone intermediates:

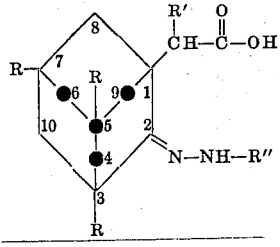

The reaction is conveniently carried out in an inert liquid reaction medium, such as, for example, one of the loweralkanols. The reaction goes forward when employing the reactants in any amounts; however, the reaction consumes the reactants in amounts representing equimolecular proportions and the use of the reactants in such amounts is preferred. The reaction goes forward under temperatures of a wide range, but is preferably conducted at temperatures of from 20° to 80° C. The reaction yields the desired hydrazone and water as by product. Ordinarily, the hydrazone precipitates in the reaction mixture and is conveniently separated by filtration; in any event, separation, and if desired, purification are conducted in conventional procedures.

The hydrazone intermediate thereby obtained is cyclized to obtain the corresponding product of the present invention:

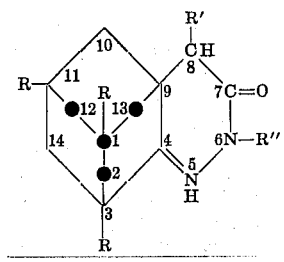

which is thereafter reduced to obtain the corresponding product:

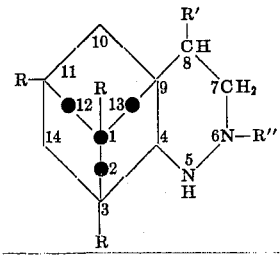

The cyclization can be effected by any of the various procedures known for the effecting of an intramolecular dehydration. Most conveniently, the hydrazone product is merely heated, as, for example, to temperatures of 175° to 250° C., in a suitable inert liquid reaction medium. In the instance of many of the hydrazones, excessive heating in the preparation of the hydrazone itself will result in cyclization. Therefore, to ensure preparation of the hydrazone intermediate, where desired, heating should be controlled. In the cyclization reaction as in the reaction preparing the hydrazone intermediate, water is produced as a byproduct. Separation and purification of the cyclic product are carried out in conventional procedures.

The reduction is similarly carried out in procedures known in the prior art. Most preferably, the initial cyclic product is reacted with excess lithium aluminum hydride in suitable solvent, conveniently an ether such as dioxane. The reaction goes forward under temperatures of aide range, but is preferably conducted at temperatures of from 60° to 120° C. Separation and purification of the product are carried out in conventional procedures.

Compounds of formulas I and II are readily reacted with suitable acids, such as hydrochloric acid, sulfuric acid and phosphoric acid, in standard procedures to obtain the corresponding acid addition salts. Particularly suited for the practice of the present invention are those salts which are pharmaceutically acceptable acid addition salts. Such salts include the chloride, bromide, iodide, sulfate, bisulfate, acetate, salicylate, valerate, laurate, benzoate, phosphate, and the like.

The following examples illustrate the present invention and will enable those skilled in the prior art to practice the present invention.

EXAMPLE 1

2-(Phenylhydrazono)-1-Adamantaneacetic Acid

Phenylhydrazine (1 milliliter; 0.01 mole) was added with stirring and at room temperature to a solution of 2-keto-1-adamantaneacetic acid (2.1 grams; 0.01 mole) in 10 milliliters of methanol. The desired 2-(phenylhydrazono)-1-adamantaneacetic acid product appeared as a crystalline precipitate; it was separated by filtration, washed with a few milliliters of ethanol, dried, and finally recrystallized from 95 percent ethanol. The purified 2-(phenylhydrazono)-1-adamantaneacetic acid product, ca. 2.85 grams, melted at 164°–165° C.

Calc. for $C_{18}H_{22}N_2O_2$:      C, 72.40; H, 7.41; N, 9.39
                   Found:      C, 72.40; H, 7.50; N, 9.44

EXAMPLE 2

6-Phenyl-5,6-Diazatetracyclo(7.3.1.1$^{3,11}$.0$^{4,9}$)-Tetradec-4-En-7-One

The 2-(phenylhydrazono)-1-adamantaneacetic acid product obtained as reported in example 1 (2.5 grams thereof) was heated in a preheated oil bath at a temperature about 200° C. for about 45 minutes. The melt, melt, on cooling, solidified and on crystallization from ethanol-n-hexane gave 6-phenyl-5,6-diazatetracyclo(7.3.1.1$^{3,11}$,-0$^{4,9}$)tetradec-4-en-7-one (2 grams; 90 percent), m.p., 73°–75° C.

Calc. for $C_{18}H_{20}N_2O$:      C, 77.11; H, 7.19; N, 10.00
                 Found:      C, 76.99; H, 7.19; N, 9.84

EXAMPLE 3

6-Phenyl-5,6-Diazatetracyclo(7.3.1.1$^{3,11}$.0$^{4,9}$)Tetradecane

To a well-stirred suspension of lithium aluminum hydride (200 milligrams) in absolute dioxane (15 milliliters) was added a solution of the 6-phenyl-5,6-diazatetracyclo(7.3.1.1$^{3,11}$.0$^{4,9}$)-tetradec-4-en-7-one obtained as reported in example 2 (1.4 grams; 0.005 mole thereof) in 10 milliliters of absolute dioxane. The mixture was heated to reflux in an oil bath in an atmosphere of nitrogen for about 2 hours. The reaction mixture was then cooled in an ice-water bath and decomposed with dropwise addition of ether containing 10 percent methanol by volume, inorganics were centrifuged out and washed with ether. The filtrate and washings were combined and evaporated under vacuum. The residue was dissolved in ether, filtered, and evaporated affording a light-yellow waxy solid which was crystallized from ethanol-ether to give 6-phenyl-5,6-diazatetracyclo(7.3.1.1$^{3,11}$.0$^{4,9}$)tetradecane, ca. 1 gram, yield ca. 72 percent, m.p., 76°–78° C.

EXAMPLE 4

5,6-Diazatetracyclo(7.3.1.1$^{3,11}$.0$^{4,9}$)Tetradec-4-En-7-One

To a solution of 2-keto-1-adamantaneacetic acid (2 grams; 0.01 mole) in 10 milliliters of absolute ethanol was added hydrazine hydrate of 95 percent purity (0.6 milliliter); the resulting solution was heated under reflux on a water bath for about 30 minutes. The solvent was evaporated and the residue was dissolved in ether; the other solution was washed with a 5 percent aqueous bicarbonate solution and with water, and then dried over sodium sulfate. The crystalline solid which was left after the removal of ether was recrystallized from ether to give the desired 5,6-diamatetracyclo(7.3.1.1$^{3,11}$.0$^{4,9}$)tetradec-4-en-7-one product, ca. 1.85 g. (ca. 91 percent), m.p., 156°–158° C.

Calc. for $C_{12}H_{16}N_2O$:      C, 70.56; H, 7.90; N, 13.71
                 Found:      C, 70.40; H, 8.00; N, 13.82

EXAMPLE 5

5,6-Diazatetracyclo(7.3.1.1$^{3,11}$.0$^{4,9}$)TETRADECANE

A solution of 5,6-diazatetracyclo(7.3.1.1$^{3,11}$.0$^{4,9}$)-tetradec-4-en-7-one obtained as described in example 4 (1.02 grams; 0.005 mole thereof) in 20 milliliters of absolute dioxane was mixed with a stirred suspension of 0.3 gram of lithium aluminum hydride in 10 milliliters of absolute dioxane. The mixture was heated under reflux in a nitrogen atmosphere for 26 hours. The reaction mixture was then decomposed and worked up as described hereinbelow in example 7, giving a gum, which was purified through chromatography in a methylene dichloride solution over a column (17×0.5 cm.) of neutral alumina, eluting the column with methylene dichloride. On removal of solvent, the desired 5,6-diazatetracyclo(7.3.1.1$^{3,11}$.0$^{4,9}$)-tetradecane product was obtained as a colorless gum (0.56 gram; 58 percent) which was dissolved in dry ether; its hydrochloride was precipitated by dropwise addition of ethanolic HCl; the precipitate was filtered, washed with ether and crystallized from 2-propanol, ca. 0.4 gram (ca. 36 percent), m.p., 144°–146° C.

Calc. for $C_{12}H_{20}N_2 \cdot HCl$:      C, 63.02; H, 9.24; N, 12.25
                     Found:      C, 63.70; H, 9.10; N, 12.35

EXAMPLE 6

6-Methyl-5,6-Diazatetracyclo(7.3.1.1$^{3,11}$.0$^{4,9}$Tetradec-—4-En-7-One

A solution of 2-keto-1-adamantaneacetic acid (2.1 grams; 0.01 mole) in 10 milliliters ethanol was treated with methylhydrazine (0.5 gram; 0.01 mole) and the mixture was heated under reflux temperature for about 30 minutes. On cooling, the desired 6-methyl-5,6-diazatetracyclo(7.3.1.1$^{3,11}$.0$^{4,9}$)tetradec-4-en-7-one product appeared as a crystalline precipitate; it was collected on a filter, washed with a little cold ethanol, dried (2 grams) and recrystallized from petroleum ether (60°–80°) (1.9 grams; 90 percent), m.p., 55°–57° C.

Calc. for $C_{13}H_{18}N_2O$:      C, 71.53; H, 8.31; N, 12.83
                 Found:      C, 71.47; H, 8.21; N, 12.80

EXAMPLE 7

6-Methyl-5,6-Diazatetracyclo(7.3.1.1$^{3,11}$.0$^{4,8}$)Tetradecane

A solution of 6-methyl-5,6-diazatetracyclo(7.3.1.1$^{3,11}$.0$^{4,9}$)-tetradec-4-en-7-one prepared as described in example 6 (1.64 grams; 0.0075 mole) in 10 milliliters of absolute dioxane was added to a well-stirred suspension of lithium aluminum hydride (300 milligrams) in absolute dioxane (25 milliliters); the stirring was continued under nitrogen and at reflux temperature on an oil bath for 2 hours. The mixture was then cooled in an ice bath and decomposed with ether/methanol (9:1 by volume), precipitated inorganics being filtered out by centrifuging and subsequently washed with ether. The combined filtrate and wash were evaporated under vacuum to obtain the desired 6-methyl-5,6-diazatetracyclo(7.3.1.1$^{3,11}$.0$^{4,9}$)tetradecane product as a residue. This product residue was dissolved in ether and filtered. The solution on evaporation yielded an oil (1.5 grams) which was distilled: 100°–102°/2 mm., to give purified product (ca. 1.3 grams; 84 percent yield).

Calc. for $C_{13}H_{22}N_2$: Found: C, 76.88; H, 10.85; N, 13.93

Hydrochloride: m.p., 232°–234° C. (sub) (ethanol/petroleum ether).

Calc. for $C_{13}H_{22}N_2 \cdot HCl$: C, 64.31; H, 9.45; N, 11.54
Found: C, 64.45; H, 9.10; N, 11.55

EXAMPLE 8

6-(p-Chlorophenyl)-5,6-Diazatetracyclo(7.3.1.1$^{3,11}$.0$^{4,9}$)-Tetradec-4-En-7-One To a solution of 2-keto-1-adamantaneacetic acid (1 gram; 0.005 mole) in 6 milliliters of ethanol was added a solution of (p-chlorophenyl)hydrazine hydrochloride (0.9 gram; 0.005 mole) in 15 milliliters of 50 percent aqueous ethanol. The mixture was heated on a water bath for 15 minutes; the desired 6-(p-chlorophenyl)-5,6-diazatetracyclo(7.3.1.1$^{3,11}$.0$^{4,9}$)tetradec-4-en-7-one product separated as a crystalline substance when the reaction mixture was cooled. This product was separated by filtration, washed with 95 percent ethanol, and dried (1.5 grams; ca. 95 percent), m.p., 158°–160° C.; recrystallization from ethanol afforded flakes, m.p., 164°–166° C.

Calc. for $C_{18}H_{19}N_2OCl$: C, 68.67; H, 6.10; N, 8.90; Cl 11.27
Found: C, 68.42; H, 6.31; N, 9.01; Cl 11.11

EXAMPLE 9

2-((p-Nitrophenyl)Hydrazono)-1-Adamantaneacetic Acid

To a solution of 2-keto-1-adamantaneacetic acid (2.1 grams; 0.01 mole) in 10 milliliters of methanol was added a solution of (p-nitrophenyl)hydrazine (1.54 grams; 0.01 mole) in glacial acetic acid-water mixture (1:2 by volume). The desired 2-((p-nitrophenyl)hydrazono)-1-adamantaneacetic acid product precipitated and was filtered, washed with ethanol, dried, and crystallized from ethanol-glacial acetic acid, ca. 3.3 grams; m.p., 204°–206° C.

Calc. for $C_{18}H_{21}N_3O_4$: C, 63.00; H, 6.14; N, 12.24
Found: C, 63.18; H, 5.90; N, 12.13

EXAMPLE 10

6-(p-Nitrophenyl)-5,6-Diazatetracyclo(7.3.1.1$^{3,11}$.0$^{4,9}$)-Tetradec-4-En-7-One The 2-((p-nitrophenyl)hydrazono)-1-adamantaneacetic acid product obtained as reported in example 9 (2.5 grams thereof) was heated in a preheated oil bath (around 215° C.) for 20 minutes, incoming moisture being prevented by a $CaCl_2$ guard tube. The brownish melt, when cold, turned into a solid mass, which was crystallized from ethanol, to give the desired 6-(p-nitrophenyl)-5,6-diazatetracyclo(7.3.1.1$^{3,11}$.0$^{4,9}$)tetradec-4-en-7-one (ca. 2.1 grams; 89 percent) m.p., 173°–175° C.

Calc. for $C_{18}H_{19}N_3O_3$: C, 66.44; H, 5.89; N, 12.91
Found: C, 66.33; H, 5.96; N, 12.62

EXAMPLE 11

6-(2-Hydroxyethyl)-5,6-Diazatetracyclo(7.3.1.1$^{3,11}$.0$^{4,9}$)-Tetradec-4-En-7-One 2-Keto-1-adamantaneacetic acid (1 gram; 0.005 mole) was dissolved in 15 milliliters of ethanol; to the solution was added (2-hydroxyethyl)hydrazine (0.4 gram; 0.005 mole) and the mixture was heated under reflux for 1 hour and then evaporated under vacuum; the resulting solid gum, the desired 6-(2-hydroxyethyl)-5,6-diazatetracyclo(7.3.1.1$^{3,11}$.0$^{4,9}$)tetradec-4-en-7-one product, was crystallized from benzene/petroleum ether (60°–80°); (ca. 1 gram; 80 percent), m.p., 94°–96° C.

Calc. for $C_{14}H_{21}N_2O_2$: C, 67.5; H, 8.5; N, 11.3
Found: C, 67.9; H, 8.2; N, 11.4

Other representative products of the present invention are prepared in accordance with the foregoing examples and teachings. Such compounds include the following:

EXAMPLES 12–14

8-Methyl-5,6-diazatetracyclo(7.3.1.1$^{3,11}$.0$^{4,9}$)tetradec-4-en-7-one, and its corresponding reduced product, 8-methyl-5,6-diazatetracyclo(7.3.1.1$^{3,11}$.0$^{4,9}$)tetradecane, are prepared from 2-keto-α-methyl-1-adamantaneacetic acid and hydrazine through the intermediate 2-hydrazono-α-methyl-1-adamantaneacetic acid.

EXAMPLES 15–17

6-m-Tolyl-5,6-diazatetracyclo(7.3.1.1$^{3,11}$.0$^{4,9}$)tetradec-4-en-7-one, and its corresponding reduced product, 6-m-tolyl-5,6-diazatetracyclo(7.3.1.1$^{3,11}$.0$^{4,9}$)tetradecane, are prepared from 2-keto-1-adamantaneacetic acid and m-tolylhydrazine, through the intermediate 2-(m-tolylhydrazono)-1-adamantaneacetic acid.

EXAMPLES 18–20

8-Ethyl-6-(2,4-dinitrophenyl)-5,6-diazatetracyclo-(7.3.1.1$^{3,11}$.0$^{4,9}$)tetradec-4-en-7-one, and its corresponding reduced product, 8-ethyl-6-(2,4-dinitrophenyl)-5,6-diazatetracyclo-(7.3.1.1$^{3,11}$.0$^{4,9}$)tetradecane are prepared from 2-keto-α-ethyl-1-adamantaneacetic acid and (2,4-dinitrophenyl)hydrazine, through the intermediate 2-((2,4-dinitrophenyl)hydrazono)-α-ethyl-1-adamantaneacetic acid.

EXAMPLES 21–23

8-n-Butyl-6-(o-chlorophenyl)-5,6-diazatetracyclo-(7.3.1.1$^{3,11}$.0$^{4,9}$)tetradec-4-en-7-one, and its corresponding reduced product, 8-n-butyl-6-(o-chlorophenyl)-5,6-diazatetracyclo-(7.3.1.1$^{3,11}$.0$^{4,9}$)tetradecane, are prepared from 2-keto-α-n-butyl-1-adamantaneacetic acid and (o-chlorophenyl)hydrazine, through the intermediate 2-((o-chlorophenyl)hydrazono)-α-n-butyl-1-adamantaneacetic acid.

EXAMPLES 24–26

6-(2,4,5-Trichlorophenyl)-5,6-diazatetracyclo-(7.3.1.1$^{3,11}$.0$^{4,9}$)tetradec-4-en-7-one, and its corresponding reduced product 6-(2,4,5-trichlorophenyl)-5,6-diazatetracyclo(7.3.1.1$^{3,11}$.0$^{4,9}$)tetradecane, are prepared from 2-keto-1-adamantaneacetic acid and (2,4,5-trichlorophenyl)hydrazine, through the intermediate 2-(2,4,5-trichlorophenyl)hydrazono)-1-adamantaneacetic acid.

EXAMPLES 27–29

6-(2-Hydroxy-1-methylethyl)-5,6-diazatetracyclo-(7.3.1.1$^{3,11}$.0$^{4,9}$)tetradec-4-en-7-one, and its corresponding reduced product, 6-(2-hydroxy-1-methylethyl)-5,6-diazatetracyclo-(7.3.1.1$^{3,11}$.0$^{4,9}$)tetradecane, are prepared from 2-keto-1-adamantaneacetic acid and (2-hydroxy-1-methylethyl)hydrazine, through the intermediate 2-((2-hydroxy-1-methylethyl)hydrazono)-1-adamantaneacetic acid.

EXAMPLES 30–32

6-sec-Butyl-1,3,11-trimethyl-5,6-diazatetracyclo-(7.3.1.1$^{3,11}$.0$^{4,9}$)tetradec-4-en-7-one, and its corresponding reduced product, 6-sec-butyl-1,3,11-trimethyl-5,6-diazatetracyclo-(7.3.1.1$^{3,11}$.0$^{4,9}$)tetradecane, are prepared from 2-keto-3,5,7-trimethyl-1-adamantaneacetic acid and sec-butylhydrazine, through the intermediate 2-(sec-butylhydrazono)-3,5,7-trimethyl-1-adamantaneacetic acid.

EXAMPLES 33-35

6-(p-Bromophenyl)-1,3-diisopropyl-5,6-diazatetracyclo-(7.3.1.1$^{3,11}$.0$^{4,9}$)tetradec-4-en-7-one, and its corresponding reduced product, 6-(p-bromophenyl)-1,3-diisopropyl-5,6-diazatetracyclo(7.3.1.1$^{3,11}$.0$^{4,9}$)tetradecane, are prepared from 2-keto-3,5-diisopropyl-1-adamantaneacetic acid and (p-bromophenyl)hydrazine, through the intermediate 2-((p-bromophenyl)hydrazono)-3,5-diisopropyl-1-adamantaneacetic acid.

The adamantanopyridazine products of the present invention are useful as anti-inflammatory agents in various inflammatory states, including arthritic conditions, and as CNS depressants, in, for example, various states of hyperexcitement. They are effective when administered to warm-blooded animals by any of the common routes, including oral, subcutaneous and the like. Generally, though, oral administration is most convenient and is therefore preferred. The compounds can be formulated to facilitate the administration of the present active agents. Thus, the compounds can be formulated in liquid or solid formulations, such as tablets, pills, capsules, granules, powders, oral solutions or suspensions, and the like. Also, where the compound serving as active agent is to be administered by a parenteral route, the compound can be formulated in a suitable injectable liquid. The exact concentration of the active agent in such formulation is not critical, it being necessary only that an appropriate dosage of the active agent, as hereinafter set forth, be supplied to the animal being treated.

In general, an anti-inflammatory effect is achieved at rates of from 1 to 250 milligrams, or more, per kilogram of animal body weight, depending upon the particular compound chosen, mode of application and the like. Such dosage can be administered at one time, or in several administrations over a given period of time, such as daily.

In implementing the CNS depressant activity of the products of the present invention, the products generally give good results at dosages of from 100–400 mg./kg. when administered orally, and at dosages of from 200–800 mg./kg. when administered intraperitoneally. Higher dosages can cause undesirable side effects, including toxic effects, and are therefore generally to be avoided. Lesser amounts, of course, can be used and are often preferred in order to achieve highly specific response.

The utility of the products of the present invention is illustrated by the following examples.

EXAMPLES 36-40

Various representative products of the present invention were evaluated for anti-inflammatory activity in accordance with a test procedure utilizing, as an indicator, carrageenin-induced oedema of the rat paw (see Winter et al., *Proc. Soc. Ex. Biol. Med.*, 111, 544–547 (1962)). Oedema in a plurality of groups of rats was induced by carrageenin, and then the various subject compounds administered to separate groups. Administration was by the oral route, on each of two successive occasions. Another group was orally given a saline solution only to serve as a control group. The degree of reduction of swelling in both the control rats and the treated rats was thereafter determined. The precise amounts of the various compounds administered, as wells the percent reduction of swelling observed, is set forth in the following table.

| Compound being evaluated | Mg./kg. in each of two doses | Percent reduction of swelling |
|---|---|---|
| 5,6-diazatetracyclo-(7.3.1.1$^{3,11}$.0$^{4,9}$)-tetradec-4-en-7-one | 100 | 44.8 |
| 6-methyl-5,6-diazatetracyclo(7.3.1.1$^{3,11}$.0$^{4,9}$)-tetradecane monohydrochloride | 100 | 43.9 |
| 6-phenyl-5,6-diazatetracyclo(7.3.1.1$^{3,11}$.0$^{4,9}$)-tetradecane | 100 | 50.7 |
| 6-(p-nitrophenyl)-5,6-diazatetracyclo(7.3.1.1$^{3,11}$.0$^{4,9}$)tetradec-4-en-7-one | 25 | 38.0 |
| 6-methyl-5,6-diazatetracyclo(7.3.1.1$^{3,11}$.0$^{4,9}$)-tetradec-4-en-7-one | 100 | 51.6 |

EXAMPLES 37-39

In other representative procedures, groups of mice, two mice per group, were employed in the evaluation of various adamantanopyridazine products of the present invention. Each group was administered one of the candidate compounds and all groups were thereafter observed in accordance with standardized test procedures for the changed response of the mice in tests for general activity, irritability, rate of respiration, and other indicators of CNS depression. In these tests, each of the compounds listed below showed CNS depression, at the dosage set forth and the mode of administration identified. In this following table, "i.p." is employed as an abbreviation for the term "intraperitoneal."

| Name of Compound | Mode of Administration | Dosages (in mg./kg.) |
|---|---|---|
| 6-(p-chlorophenyl)-5,6-diazatetracyclo(7.3.1.1$^{3,11}$.0$^{4,9}$)-tetradec-4-en-7-one | i.p. | 200 |
| 6-(2-hydroxyethyl)-5,6-diazatetracyclo(7.3.1.1$^{3,11}$.0$^{4,9}$)-tetradec-4-en-7-one | oral | 200 |
| 6-methyl-5,6-diazatetracyclo-(7.3.1.1$^{3,11}$.0$^{4,9}$)tetradecane hydrochloride | i.p. | 400 |

In the instance of the last of the three compounds, muscle weakness was also noted.

The 2-keto-1-adamantaneacetic acids to be employed as a starting material in accordance with the present invention:

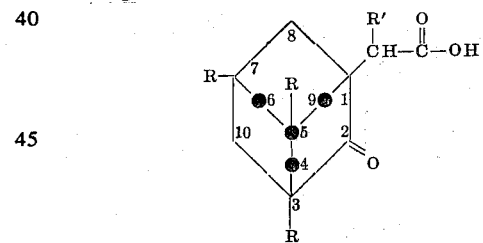

are prepared by the oxidation, for example, with an alkaline permanganate solution, of the corresponding 2-hydroxy-1-adamantaneethanol:

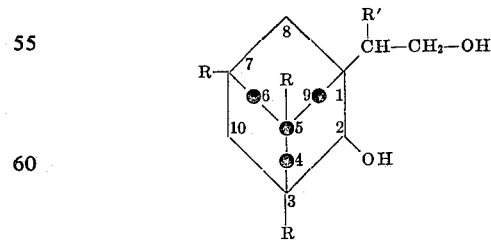

In a representative operation, there was prepared a well-stirred suspension of a 2-hydroxy-1-adamantaneethanol (3 grams) in 6.6 milliliters of 10 percent aqueous solution of sodium hydroxide. To this suspension, there was gradually added a solution of potassium permanganate (4.2 grams) in 85 milliliters of water. After this addition, a deep-green color persisted, and another batch of permanganate solution (4.2 grams in 85 milliliters of water) was added gradually and the reaction mixture was mildly heated on a steambath for about 3 hours and then kept overnight at ordinary room temperature. The solution was filtered from manganese dioxide and the precipitate washed with water. The combined filtrate and wash were extracted with ether. The aqueous layer was then acidified with dilute sulfuric acid and the precipitated acid was extracted into ether. The ether solution was washed with water, dried with magnesium sulfate, and evaporated under vacuum. The resulting solid was crystallized from a mixture of ether and n-hexane to give the desired 2-keto-1-adamantaneacetic acid product (2.5 grams; 80 percent), m.p., 145°–146° C. The acid was further characterized through its oxime, m.p., 153°–155° C., its dinitrophenylhydra-zone, m.p., 258°–260° C., and its semicarbazone, m.p., 222°–224° C.

Other of the 2-keto-1-adamantaneacetic acid starting materials are prepared in similar procedures. All of the necessary 2-hydroxy-1-adamanteneëthanol compounds are prepared in the same manner described for the preparation of 2-hydroxy-1-adamantaneëthanol in pending U.S. application for Letters Patent Ser. No. 675,037, filed Oct. 13, 1967.

We claim:

1. A compound selected from the group consisting of the compounds of the formulas

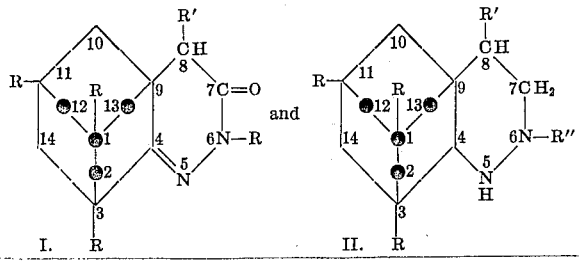

I.      and      II.

wherein R represents hydrogen or loweralkyl of $C_1$—$C_3$, both inclusive, the sum of the number of carbon atoms in all three R groups being not greater than 6; R' represents hydrogen or straight-chain loweralkyl of $C_1$—$C_6$; and R" represents hydrogen, loweralkyl of $C_1$—$C_4$, hydroxyloweralkyl of $C_1$—$C_4$, phenyl, or substituted phenyl of the formula

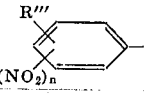

wherein R''' represents bromo, chloro, or methyl; $m$ represents 0–3, both inclusive; and $n$ represents 0–2, both inclusive, the sum of $m$ and $n$ being an integer of from 1–3, both inclusive; and pharmaceutically acceptable acid addition salts thereof.

2. The compound of claim 1 which is of formula I.

3. The compound of claim 2 which is 5,6-diazatetracyclo-(7.3.1.1$^{3,11}$.0$^{4,9}$)tetradec-4-en-7-one.

4. The compound of claim 2 which is 6-methyl-5,6-diazatetracyclo(7.3.1.1$^{3,11}$.0$^{4,9}$)tetradec-4-en-7-one.

5. The compound of claim 2 which is 6-(2-hydroxyethyl)-5,6-diazatetracyclo(7.3.1.1$^{3,11}$.0$^{4,9}$)tetradec-4-en-7-one.

6. The compound of claim 2 which is 6-phenyl-5,6-diazatetracyclo(7.3.1.1$^{3,11}$.0$^{4,9}$)tetradec-4-en-7-one.

7. The compound of claim 2 which is 6-(p-chlorophenyl)-5,6-diazatetracyclo(7.3.1.1$^{3,11}$.0$^{4,9}$)tetradec-4-en-7-one.

8. The compound of claim 2 which is 6-(p-nitrophenyl)-5,6-diazatetracyclo(7.3.1.1$^{3,11}$.0$^{4,9}$)tetradec-4-en-7-one.

9. The compound of claim 1 which is of formula II.

10. The compound of claim 9 which is 5,6-diazatetracyclo(7.3.1.1$^{3,11}$.0$^{4,9}$)tetradecane.

11. The compound of claim 9 which is 6-methyl-5,6-diazatetracyclo(7.3.1.1$^{3,11}$.0$^{4,9}$)tetradecane.

12. The compound of claim 9 which is 6-phenyl-5,6-diazatetracyclo(7.3.1.1$^{3,11}$.0$^{4,9}$)tetradecane.

* * * * *

PO-1050
(5/69)

UNITED STATES PATENT OFFICE
CERTIFICATE OF CORRECTION

Patent No. 3,627,764          Dated December 14, 1971

Inventor(s) Stephen Slomo Szinai et al.

It is certified that error appears in the above-identified patent and that said Letters Patent are hereby corrected as shown below:

In column 1, line 71, the following should be added after the closing parenthesis: --tetradecane--.

In column 3, line 7, "aide" should be changed to --a wide--; also in column 3, at line 49, "about" should be changed to --around-- and the second occurrence of "melt," should be cancelled; and after Example 3, at the end of column 3, the following should be added:

Calc. for $C_{18}H_{24}N_2$:    C, 80.64; H, 9.00; N, 10.34,
          Found:    C, 80.88; H, 8.88; N, 9.83.

In column 4, line 9, "other" should be changed to --ether--; and in column 4, line 13, "diamatetracyclo" should be changed to --diazatetracyclo--.

In column 5, line about 9, the word "Found" should be deleted and the following insertion made into line 10:

--Found:    C, 76.21; H, 10.83; N, 12.93.--.

Also in column 5 at each of lines 48 and 65, "$C_{13}$" should be changed to --$C_{18}$--.

In column 6, line 56, a second opening parenthesis should be inserted immediately adjacent to the existing one.

In column 7, line 63, "wells" should be changed to --well as--; also in column 7, at line 74, "43.9" should be changed to --48.9--.

In column 8, line 20, there should be inserted between "and" and "the" the word --in--.

UNITED STATES PATENT OFFICE
CERTIFICATE OF CORRECTION

Patent No. 3,627,764          Dated December 14, 1971

Inventor(s) Stephen Slomo Szinai et al.

It is certified that error appears in the above-identified patent and that said Letters Patent are hereby corrected as shown below:

- 2 -

In Claim 1, the right-hand portion of structural Formula I should be:

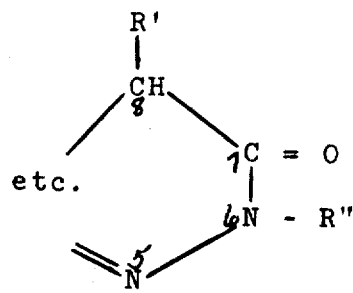

Signed and sealed this 25th day of July 1972.

(SEAL)
Attest:

EDWARD M. FLETCHER, JR.      ROBERT GOTTSCHALK
Attesting Officer             Commissioner of Patents